(12) United States Patent
Waddington et al.

(10) Patent No.: US 7,624,385 B2
(45) Date of Patent: Nov. 24, 2009

(54) METHOD FOR HANDLING PREPROCESSING IN SOURCE CODE TRANSFORMATION

(75) Inventors: Daniel G. Waddington, Tinton Falls, NJ (US); Bin Yao, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 618 days.

(21) Appl. No.: 11/093,530

(22) Filed: Mar. 30, 2005

(65) Prior Publication Data
US 2006/0225052 A1    Oct. 5, 2006

(51) Int. Cl.
G06F 9/45    (2006.01)
(52) U.S. Cl. .................. 717/143; 717/141; 717/142; 717/144
(58) Field of Classification Search .......... 717/141–144
See application file for complete search history.

(56) References Cited

U.S. PATENT DOCUMENTS

| | | | |
|---|---|---|---|
| 5,946,488 A * | 8/1999 | Tanguay et al. ............. | 717/141 |
| 6,029,002 A | 2/2000 | Afifi et al. | |
| 6,149,318 A * | 11/2000 | Chase et al. ................ | 717/131 |
| 6,427,228 B1 * | 7/2002 | Wigger ....................... | 717/111 |
| 6,542,906 B2 | 4/2003 | Korn | |
| 6,668,325 B1 * | 12/2003 | Collberg et al. ............. | 713/194 |
| 7,228,529 B2 | 6/2007 | Bera | |
| 2002/0059469 A1 | 5/2002 | Gray et al. | |
| 2003/0084424 A1 | 5/2003 | Reddy et al. | |
| 2003/0149689 A1 | 8/2003 | Chow et al. | |
| 2003/0182572 A1 * | 9/2003 | Cowan et al. ............... | 713/200 |
| 2004/0230886 A1 | 11/2004 | Livshits | |
| 2005/0039173 A1 * | 2/2005 | Tondreau et al. ............ | 717/136 |
| 2006/0212859 A1 | 9/2006 | Parker et al. | |

OTHER PUBLICATIONS

Mario Latendresse "Fast Symbolic Evaluation of C/C++ Preprocessing Using Conditional Values" IEEE 2003.*
Mario Latendresse, "Fast Symbolic Evaluation of C/C++ Preprocessing Using Conditional Values", 2003, IEEE Computer Society.*
Marian Vittek, "Refactoring Browser with Preprocessor", 2003, IEEE Computer Society.*
Vittek et al., Refactoring Browser with Preprocessor, Mar. 2003, In Proceedings of 7th European Conference on Software Maintenance and Reengineering, pp. 101-110.*
Garrido et al., Challenges of Refactoring C Programs, 2003, ACM.*
A. Malton et al., "Processing Software Source Text in Automated Design Recovery and Transformation," Proc. IWPC 2001, IEEE 9$^{th}$ International Workshop on Program Comprehension, Toronto, May 2001, pp. 127-134.

(Continued)

Primary Examiner—Wei Y Zhen
Assistant Examiner—Junchun Wu
(74) Attorney, Agent, or Firm—Wall & Tong LLP (57) ABSTRACT

A method for handling preprocessing in source code transformation creates a semantically correct view of a program being transformed. This semantically correct view is called a transformed form and it is capable of being parsed with a regular grammar. The original use of preprocessing macros is determined, including their relationship to the transformed form and the preprocessing is reconstructed in the modified source code.

21 Claims, 4 Drawing Sheets

OTHER PUBLICATIONS

I. D. Baxter and M. Mehlich, "Preprocessor Conditional Removal by Simple Partial Evaluation," Proceedings Eighth Working Conference on Reverse Engineering, Oct. 2001, pp. 281-290.

L. Aversano, "Handling Preprocessor-Conditioned Declarations," Proceedings Second IEEE International Workshop on Source Code Analysis and Manipulation, Oct. 2002, pp. 83-92.

A. Garrido and R. Johnson, "Refactoring C With Conditional Compilation," 18$^{th}$ IEEE International Conference on Automated Software Engineering (ASE 2003), Montreal, Canada 2003, pp. 323-326.

M. Vittek, "Refactoring Browser With Preprocessor," Proceedings of 7$^{th}$ European Conference on Software Maintenance and Reengineering, Mar. 2003, pp. 101-110.

I. D. Baxter et al, "DMS: Program Transformations for Practical Scalable Software Evolution", Proceedings, International Conference of Software Enginering, May 2004.

A. Garrido and R. Johnson, "Handling Preprocessor Macros in Refactoring," ACM SIGPLAN Conference on Programming Language Design and Implementation, 2004.

Burson et al., "A Program Transformation Approach to Automated Software Re-Engineering," 1990, IEEE pp. 314-322.

* cited by examiner

METHOD FOR HANDLING PREPROCESSING IN SOURCE CODE TRANSFORMATION

CROSS-REFERENCES

The present application is related to copending applications "A Method for Performing Conditionalized N-Way Merging of Source Code", application Ser. No. 11/093,517 and "Technique for Constructing Syntax-Directed Search and Modifications in Program Transformation Systems", application Ser. No. 11/093,518, which were filed on the same date as the present application. These copending applications are incorporated herein by reference in their entireties.

FIELD OF THE INVENTION

The present invention relates generally to the field of programming languages and program source code transformation (a/k/a meta-programming) and, in particular, relates to preprocessing.

BACKGROUND OF THE INVENTION

There is a need to address the problem of enabling the transformation of source code, such as C and C++ program code that includes direct use of C preprocessing directives. Preprocessing can be seen as a pre-compilation meta-programming stage, which, among other things, processes macros and conditionals for different source code branches. There is a need for the ability to correctly handle preprocessing, when applying source code transformation techniques in a commercial software development environment, i.e. beyond academic examples.

Figure 1:
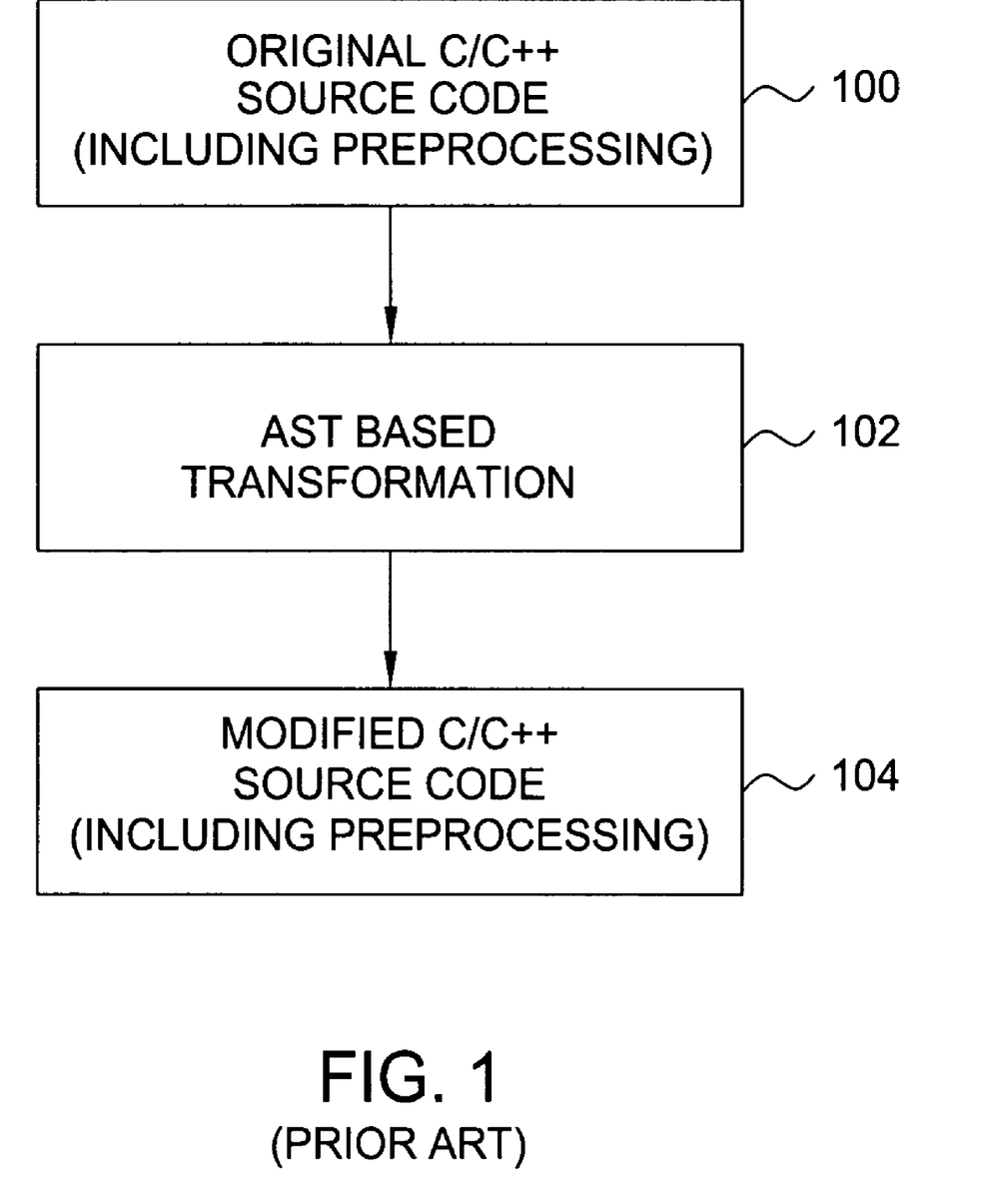
FIG. 1 shows an abstraction of the transformation problem in the prior art.

FIG. 1 shows an abstraction of this transformation problem. Most powerful source code transformation tools (that can perform context-sensitive modifications) are based on the modification of a structured representation of the source code known as an Abstract Syntax Tree (AST). As the name suggests, the AST provides an abstraction over the lexical detail of source code, while exposing a more generalized structural view. The AST is generated from a target language grammar. In FIG. 1, original C/C++ source code 100 is processed by an AST-based transformation 102 to produce modified C/C++ source code 104.

Existing solutions typically take one of the following two forms, neither of which is practical in a commercial setting. In the first form, transformation is performed after the preprocessing stage (i.e., on pure C and C++ source code) and preprocessing details are not replaced. Loss of preprocessing leads to unwieldy source code that is difficult to maintain and disliked by developers. In the second form, preprocessing directives are partially integrated into the grammar forming a unified grammar by extending the C/C++ languages for typical directive usage. The directive information is parsed and included in the AST. Because of the context-free nature of the C preprocessing language, this is not a complete solution. A significant volume of code is not parsable by the unified-grammar; thus, a pre-transformation stage is required to re-write problematic directive usage.

SUMMARY

Various deficiencies of the prior art are addressed by the present invention of a method of preprocessing in C/C++ source code transformation.

One aspect of the present invention is a method for handling preprocessing in source code transformation. Original source code is deconditioned to produce a parsable source code derived from the original source code including original preprocessing. The parsable source code is parsed to produce an abstract syntax tree (AST) form. An AST-based transformation is performed on the AST form to produce modified source code. A reconditioning process reconstructs that portion of the original preprocessing that was unaffected by the AST-based transformation in the modified source code. Another aspect is a computer-readable medium having instructions stored thereon for performing this method.

A further aspect is a system for handling preprocessing in source code transformation, which includes a deconditioning component, a parser, a transformation engine, and a reconditioning component. The deconditioning component deconditions an original source code to produce a parsable source code, where the original source code includes original preprocessing. The parser parses the parsable source code to produce an abstract syntax tree (AST) form. The transformation engine performs an abstract syntax tree (AST)-based transformation on the AST form to produce modified source code. The reconditioning component reconstructs portions of the original preprocessing that were unaffected by the AST-based transformation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a method for preprocessing in C/C++ source code transformation, however, those skilled in the art and informed by the teachings herein will realize that the invention is also applicable to any high level source code, low level source code, source code transformation, meta-programming, automated transformation tools, preprocessors, postprocessors, manually performed steps, partially automated and partially interactive or manual steps, instructions in software or firmware components storable in the memory of and executable on many different kinds of computing machines, such as a personal computer (PC) with an operating system, such as Linux, application program interfaces (APIs), debugging, profiling, software porting, software executable on multiple platforms, prototyping, software environments, and many other different kinds of applications.

One exemplary embodiment includes a method for creating a semantically correct view of a program being transformed that can be readily parsed with a regular C/C++ grammar. We term this view the transformed form. The exemplary embodiment also includes a method for determining the original use of preprocessing macros and their relationship to the transformed form and a method of reconstructing preprocessing in the modified source code.

In this exemplary embodiment, we define a number of reference points for each form that program source code takes during the transformation process as shown in Table 1.

TABLE 1

Defined reference points.

| Form | Description |
|------|-------------|
| F-A | Original C/C++ source code that includes the original form of preprocessing. Preprocessing includes the use of directives (e.g., #include, #define, #if, #ifdef, #error) as well as the use of pre-processor macros. |
| F-B | Pure form of the source program that can be readily parsed by a regular C/C++ grammar. |
| F-C | AST form of the original code. |
| F-D | AST form of the modified code. |
| F-E | Modified version of the C/C++ source code that includes the original preprocessing that has not been directly affected by the transformation process. |

Figure 2:
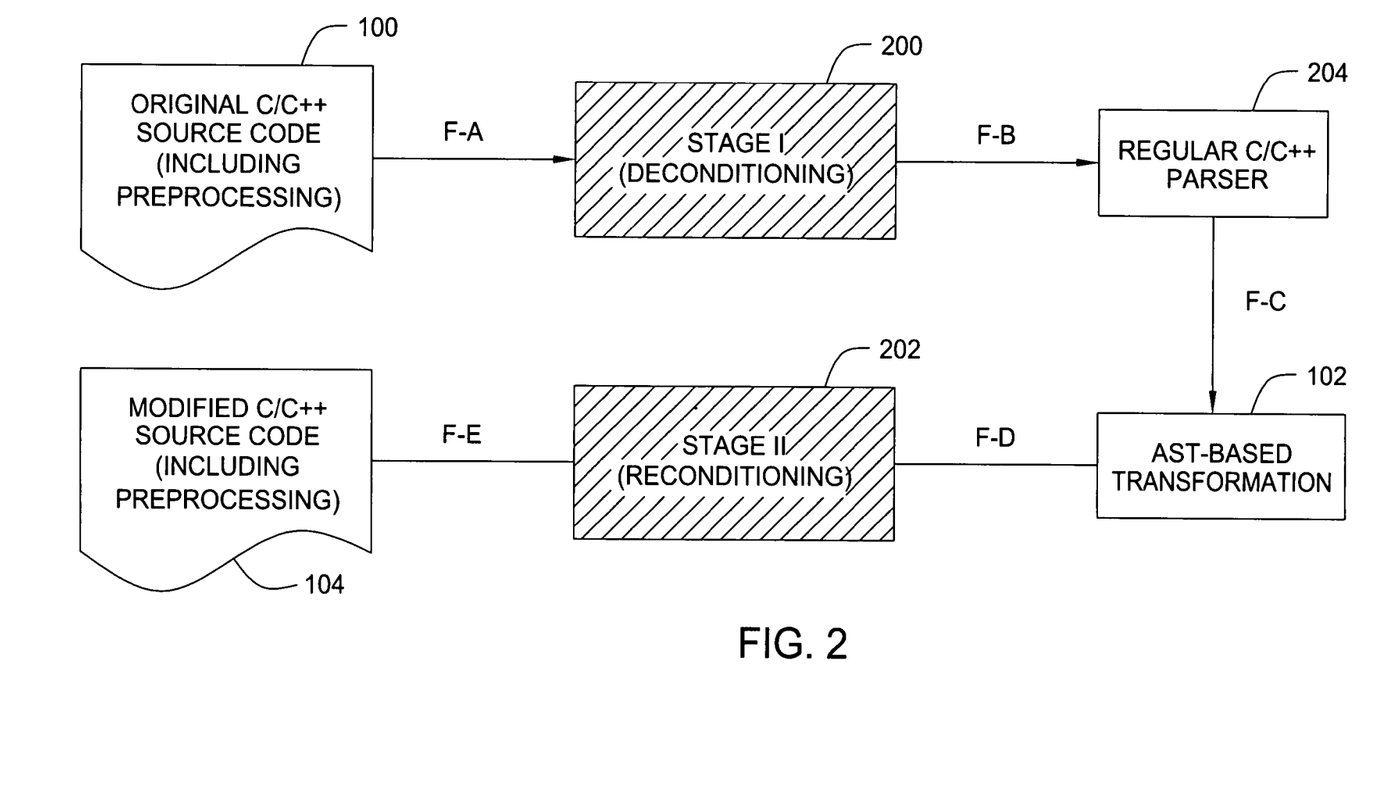
FIG. 2 shows two stages of an exemplary embodiment of the invention in a larger context.

FIG. 2 shows two stages of an exemplary embodiment of the invention in a larger context. The first stage 200 is a process of deconditioning the source code in form F-A to form F-B, as well as the form F-B itself. The second stage 202 is a process of reconditioning the modified AST form F-D back into source form F-E. The deconditioning 200 and reconditioning stages 202 are shown in FIG. 2 in the context of a regular C/C++ parser 204 along with the original C/C++ source code 100, modified C/C++ source code 104, and AST-based transformation 102.

Conditional Slicing and Merging

Figure 3:
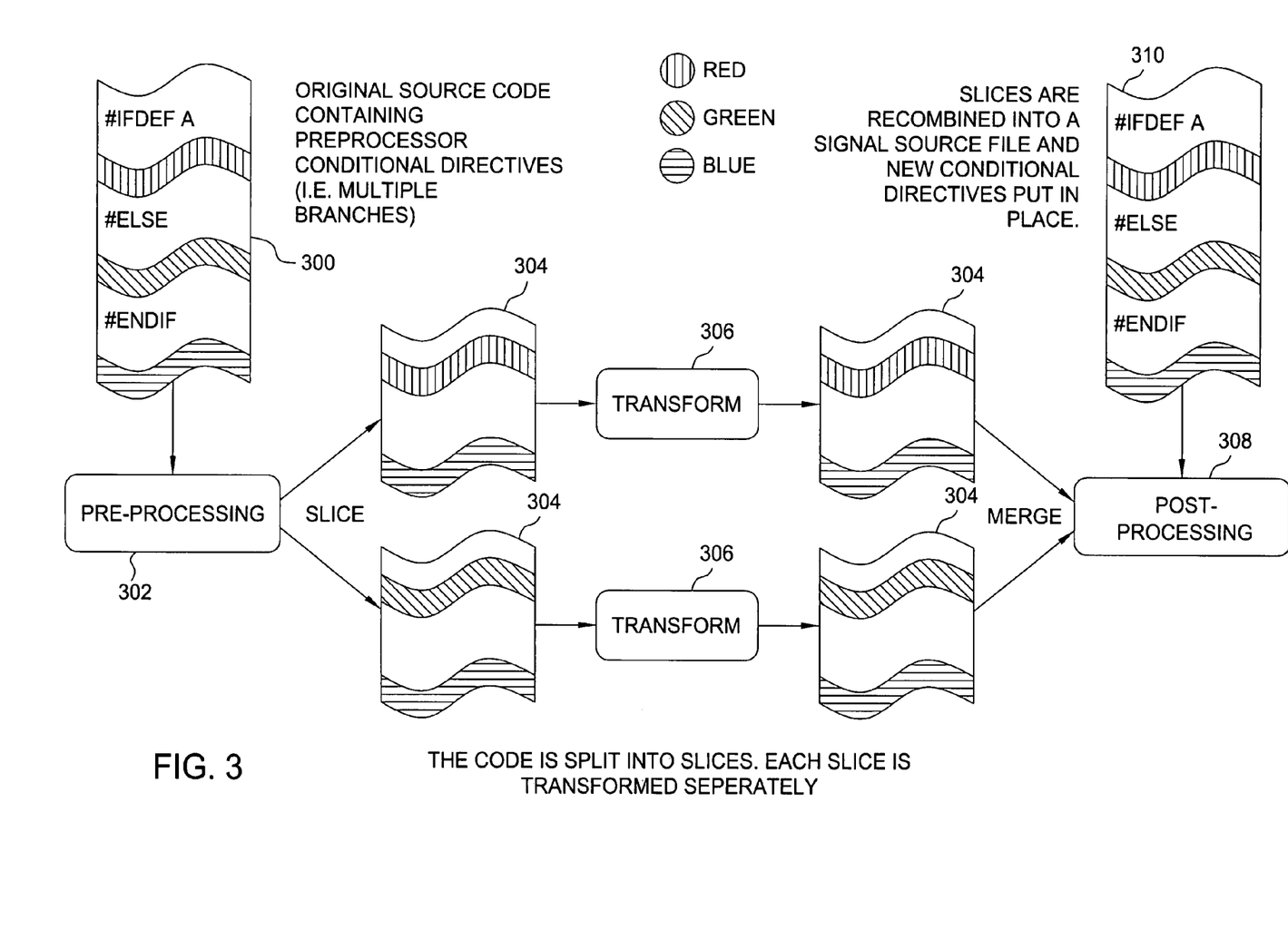
FIG. 3 shows an exemplary embodiment of a method of conditional slicing and merging.

FIG. 3 shows an exemplary embodiment of a method of conditional slicing and merging. Original source code 300, 310 containing preprocessor conditional directives (i.e., multiple branches) is input to a pre-processing component 302. The pre-processing component 302 outputs slices 304, which are input to transform components 306, such as a transformation engine. The transform components 306 transform slices 304 in parallel and, then, the slices 304 are merged by a post-processing component 308. The slices 304 are recombined into source code 310 and new conditional directives are placed in the source code 310. The source code 310 is a single file in this exemplary embodiment.

Preprocessor conditional directives are effectively used to support multiple versions (a/k/a branches) of a program in a single source code representation 310. For example, a given program's original source code 300 may be supported for multiple different operating systems, each bounded by a given conditional combination. Performing transformations on original source code 300 that includes multiple branches is inherently difficult, particularly where complex expressions define the conditions that dictate the validity of each branch.

In order to present a semantically correct view of the program to the transformation engine, this exemplary embodiment uses a process known as slicing and merging. This process allows each branch of interest to be transformed in parallel and then combined into a single multi-branch representation. There is no need to transform all mathematical combinations provided that the conditions relevant to the branches that are being transformed can be identified.

In this exemplary embodiment, a conditional directive is expressed with respect to the existence and/or value of a symbol that has been defined through the #define directive or passed to the compiler through the –D command line option. More complex conditions are composed through the combination of these basic tests with operators (e.g., !, <, >, ==, !=).

In this exemplary embodiment, symbol sets that define conditions of interest are extracted from the build environment (e.g., makefile and build output) through simple string pattern matching. A deconditioning process, described below, is then used to create each individual slice. The symbols are passed to a deconditioning tool through the conventional –D command line option. Symbols can be inherently defined through the #define preprocessor directive.

Stage I—Deconditioning: Converting F-A to F-B

In this exemplary embodiment, the deconditioning process 200 is based on a variation of conventional C preprocessing. Although its functionality is similar in terms of logical interpretation of preprocessing directives and macros, the output from the deconditioning process 200 is significantly different from that of a conventional preprocessor. The functionality of the deconditioning process is defined as follows:

Function Decond-1: Evaluate preprocessing conditional directives and mask out branches of code that do not evaluate to true.

Function Decond-2: Expand macros and annotate (tag) the source code with meta-data indicating the sequence of expansions.

Function Decond-3: Remove line continuations (i.e., the '\' character) and annotate (tag) the source code with meta-data indicating where the line has been split.\

Function Decond-1

In this exemplary embodiment, lines that are conditionalised by predicates that do not hold, and the directives themselves are masked out by the first function of deconditioning, Function Decond-1. Masking is performed by simply converting lines in question into C++ comments by prepending the string "//" and a special label to indicate that the comment is actually meta-data.

For example:

```
#ifdef TRUE
int x;
#else
long x;
#endif
```

Is deconditioned to:

```
//[YPP:COND]// #ifdef TRUE
int x;
//[YPP:COND]// #else
//[YPP:COND]// long x;
//[YPP:COND]// #endif
```

In this exemplary embodiment, the effect of masking is that the line of code is treated as a comment and thus excluded from the program's semantics. Conditional expressions, such as those used in #if statements are evaluated according to standard C preprocessing rules. This includes the evaluation of context sensitive conditionals where #define and/or #undef are used throughout the source code.

Function Decond-2

In this exemplary embodiment, the second function of deconditioning, Function Decond-2 is the expansion of preprocessor macros and the insertion of meta-data tags that record the sequence of expansions.

Meta-Data Tagging

In this exemplary embodiment, tags are used to mark macro expansions as well as line continuations. Tags are realised as in-line C comments. Macro-expansions are given as:

Δ/*SME:M:P1#P2#P3*/_expanded_text_/*EME*/

Where M is the macro name, Pn represents the original parameter form, and Δ represents the space character. When there are no parameters, the expansion is:

Δ/*SME:M*/_expanded_text_/*EME*/

The macro-expansion tags are always used in pairs. The end tag delimits the expanded text.

Macros that are define as 'null' (i.e. without a right-hand side of the define directive), the expansion is given:

```
Δ/*NUL:M*//*EME*/
Or
Δ/*NUL:P1#P2#P3*//*EME*/
```

Where M is the macro name and Pn are the parameters used in the original form.

Line continuations are given as:

Δ/*[SPL:n:x,y,z]*/

Where n is the original length of the line and x,y,z are the recorded column positions of the line splits.

As with function Decond-1, the preprocessor macro usage is expanded according to standard C preprocessing rules. This includes the interpretation of concatenation operators (##). Expansions are recursive, that is, source text is expanded until no more macros exist. The effect of this is that macro expansion tags become nested within one another.

```
#define X    32 >> 4
#define Y    (X) << 2
a = Y;
```

Becomes:
a=/*SME:Y*/(/*SME:X*/32 >>4/*EME*/)<<2/*EME*/;

During the Function Decond-2 processing stage, macros that have been defined and used throughout the source program are recorded in a separate file (suffixed .macros). For example, the .macros for the above excerpt is given:

define X32>>4
define Y (X)<<2

The .macros file is used to make macro replacements during the reconditioning stage 202, discussed below.

Function Decond-3

In this exemplary embodiment, the final stage of the deconditioning function, Function Decond-3, is removal of line continuation character '\'. This character is used in the C language to create a line break in the source code but not in the preprocessed code. It is typically used for breaking up long lines, which look unwieldy when viewed in a text editor.

For example:

```
const char * str = {"hello \
world"};
``` is seen by the compiler as:
const char*str={"hello world"};

Function Decond-3, the third stage of the deconditioning process, removes line continuation characters and inserts a meta-data tag at the beginning of the respective line. For example, our previous excerpt:

```
const char * str = {"hello \
world"};
```

Becomes:
/*[SPL:37:27]*/const char*str={"hello world"};

Which indicates that the line, up to the carriage return character (\n) was originally split at column position 27 and that the original length of the line is 37 characters long. If more than one line split occurs on a given line, then all of the splits for that single line are co-located (as a comma separated list) in the same split tag. Consider the following excerpt:

```
const char * str = {"hello \
wor\
ld"};
```

Becomes:
/*[SPL:37:27,30]*/const char*str={"hello world"};

Both line continuations within string literals and within the program constructs are recorded in the same way.

Representations in the AST: Form F-C

This exemplary embodiment includes a process for generating representations in the AST to represent the meta-data that exists in form F-B. The meta-data that has been introduced by the deconditioning process 200 is represented as annotations (which can be viewed as attachments) on the AST nodes. This means that transformations can be performed on the source code without adversely loosing the meta-data information. After the AST has been re-written, the annotations are written back into comment-based tags producing form F-D.

Stage II—Reconditioning

This exemplary embodiment includes reconditioning process 202, which attempts to reverse the deconditioning process 200 by taking the form F-D that incorporates meta-data tags and masked out conditions and converting it back into a form that includes the original C preprocessing directives and the original macro usage.

In this exemplary embodiment, the functionality of the reconditioning process 202 is defined as follows:

Function Recond-1: Unmask conditionals.
Function Recond-2: Reduce expanded macros back into their original form as far as possible (this is potentially limited by modifications to the source code).
Function Recond-3: Replace line continuations (i.e. the '\' character) according to line break tags.

Function Recond-1

In Function Recond-1, the removal of conditional masking includes using the following regular expression to pattern match on the masked expressions.
//[YPP:COND]//Δ([^\n]+)

Where Δ is the space character, and ([^\n])+ matches the group of characters up to end of line character (\n). From herein we shall use the symbol group[n] to represent the nth group matched by the regular expression.

```
//[YPP:COND]//Δ([^\n]+) is replaced with group[1].
Thus,
//[YPP:COND]// #ifdef TRUE
int x;
//[YPP:COND]// #else
```

Is reconditioned back to its original form:

```
#ifdef TRUE
int x;
#else
Function Recond-2
```

In this exemplary embodiment, Function Recond-2 of the reconditioning process 202 involves reduction of expanded text back into its original form, as far as possible. Variations in parameters are allowed; that is, as long as the parameter can be successfully replaced, the macro is reduced. The method for Function Recond-2 includes:

1. Given a string S, search for innermost (with respect to nesting) pair of /SME:xxx*/,/*EME*/tags. An innermost pair is defined as a pair that does not contain any further nested SME/EME tags. Innermost pair is given at position P.
2. Reduce expansion at position P.
3. Continue from position P, return to the start if the end is reached.

Terminate if there are no more SME/EME pairs. By continuing from position P the search is optimized, avoiding repetition of previously search text. This approach means that the maximum number of iterations over the whole text is equal to the maximum depth of any nested macros.

Regular Expression Derivation

In this exemplary embodiment, the innermost pair search results in the expanded macro name as well as the expanded representation. Reduction is the process of replacing the expanded representation with the original macro and the appropriate parameters. In order to perform the reduction, a regular expression for the macro is required. This regular expression is used to match on the expanded version of the macro while additionally "extracting" the values of the parameters used in the original macros. This allows the appropriate parameters to be replaced in the reduced representation.

Given an example macro definition:
define MAX(A,B) (A>B) ? A:B

The regular expression is derived as follows:

Take expanded version of text for given macro:
(A>B)?A:B

Convert regular expression meta-characters (i.e. those used to build the regular expression) into single character classes or back-slashified characters:
[(]A>B[)][?]A[:]B Replace parameter 'uses' with []*\\(.+\\)[]*. The sequences \\( and \\) are used to form groups that can be later extracted from the matched expressions.

The final regular expression is given as:
[(]][]*\\(.+\\)[]*>[]*\\(.+\\)[]*[]*D][?]][]*\\(.+\\)[]*
   [:]][]*\\(.+\\)[]*

This expression is used to match on the text delimited by the /SME:xxx*/,/*EME*/tags. On a successful match, the group matches can be used to extract the parameters. Only the group associated with a given parameter is used. The parameters of the original macro definition that are not used cannot be reduced back to their original form. This is a rare case. If it does occur then the parameter name itself is left in place.

Given the following code excerpt:
x=/*SME:MAX:x#9*/(x>9)? x:9/*EME*/;

The previously defined regular expression will match. The first and third groups will match to 'x' and the second and forth to 9. Thus, the form can is reduced to:
x=MAX(x,9);

Modifications to parameters are also allowed. For example:
x=/*SME:MAX:x#9*/(x>10)? x:10/*EME*/;

Is reduced to:
x=MAX(x,10);

If the reduction process is unsuccessful, lets say because the source code has been modified, then the expanded form is left alone and a warning comment append.

For example, given the following code excerpt (where > is exchanged for >=):
x=/*SME:MAX:x#9:/(x>=9)? x:9/*EME*/;

Then the result of the reduction is given.
x=(x>=9)? x:9; /*unable to reduce*/

Function Recond-2 is also responsible for replacing null defined macros that have been label with /*NUL:M . . . */ tags. These are matched with the following regular expression:
[]/[*]NUL:\\([A-Za-z0-9_]*\\)\\(.*\\)?[*]/

Hence:
/*NUL:M:0#1#2*//*EME*/;

Is expanded to:
M(0,1,2);

Function Recond-3

Function Recond-3 is the final stage of the reconditioning process 202 that reinserts line split characters '\'. The basic approach is to match for instances of the SPL tags that were inserted during the deconditioning phase 200. The first field of the SPL tag indicates the original line length. If the length of the line has changed, the line splits are not inserted. Otherwise, the line split and a new line are inserted at the respect indices. For example:
/*[SPL:37:27,30]*/const char*str={"hello world"};

Becomes:

```
const char * str = {"hello \
wor\
ld"};
```

If the line length has not changed, then it is acceptable to split the line at the same positions.

Figure 4:
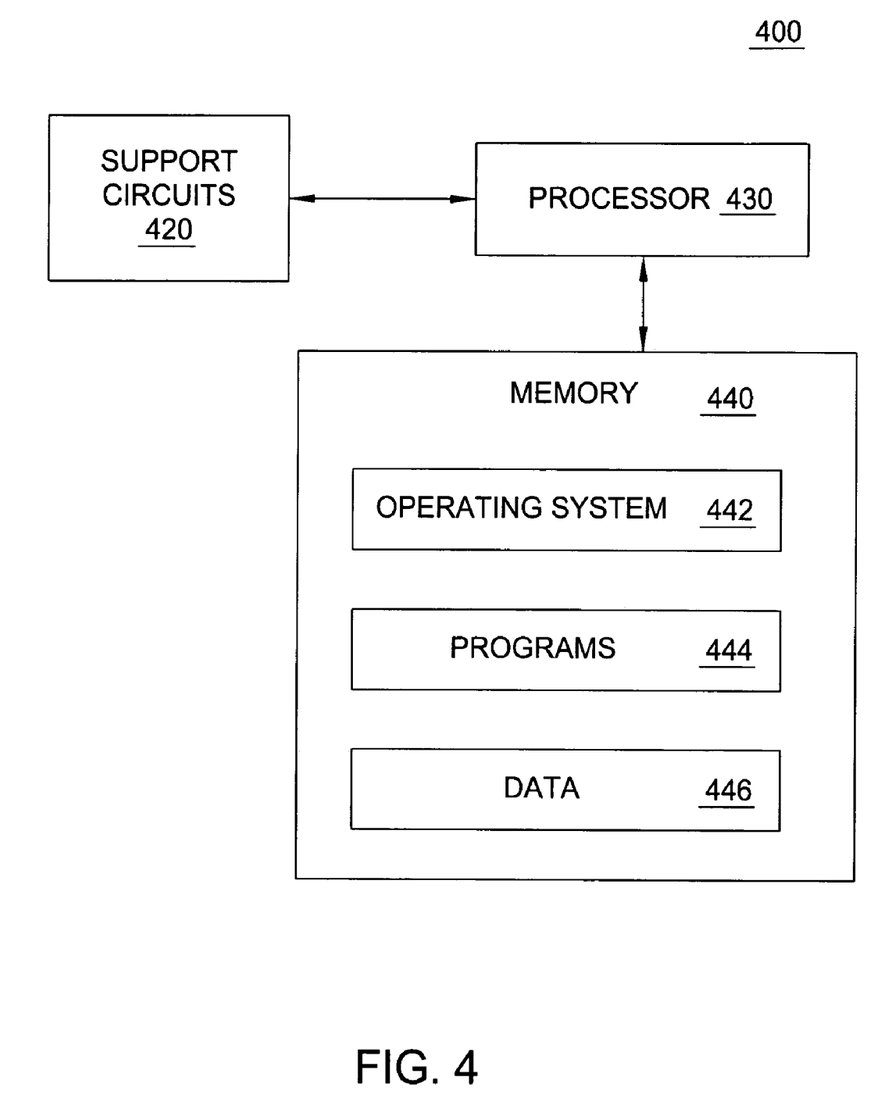
FIG. 4 is a high level block diagram showing a computer.

FIG. 4 is a high level block diagram showing a computer. The computer 400 may be employed to implement embodiments of the present invention. The computer 400 comprises a processor 430 as well as memory 440 for storing various programs 444 and data 446. The memory 440 may also store an operating system 442 supporting the programs 444.

The processor 430 cooperates with conventional support circuitry such as power supplies, clock circuits, cache memory and the like as well as circuits that assist in executing the software routines stored in the memory 440. As such, it is contemplated that some of the steps discussed herein as software methods may be implemented within hardware, for example, as circuitry that cooperates with the processor 430 to perform various method steps. The computer 400 also contains input/output (I/O) circuitry that forms an interface between the various functional elements communicating with the computer 400.

Although the computer 400 is depicted as a general purpose computer that is programmed to perform various functions in accordance with the present invention, the invention can be implemented in hardware as, for example, an application specific integrated circuit (ASCI) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions. The fixed or removable media and the working memory may be more generally referred to as computer readable storage media, some examples of which included, but are not limited to, random access memory (RAM), read only memory (ROM), magnetic or optical drive or diskette, flash memory, and the like, as well as various combinations thereof.

The previously described embodiments of the present invention have many advantages, such as performing transformations on source code that contains directives or macro uses. Another advantage is transformations that are made by a virtual developer in a human development team where changes made by the transformation system are not distinguishable from changes made by a developer. Another advantage is preserving the original intentions of the programmer with conditional directives. Another advantage is being able to handle complex embedding of conditions and contextual definitions caused by #undef. Another advantage is not having restrictions on input source code and not requiring manual effort before the source code can be parsed.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for handling preprocessing in source code transformation, comprising:
    deconditioning an original source code to produce a parsable source code, the original source code including original preprocessing directives;
    parsing the parsable source code to produce an abstract syntax tree (AST) form, the AST form comprising annotations adapted to facilitate preservation of a style of the original source code;
    performing an AST-based transformation on the AST form to produce a modified AST form; and
    reconditioning the modified AST form to produce a modified source code conforming to the original source code style, the reconditioning comprising reconstructing a portion of the original preprocessing directives that was unaffected by the AST-based transformation.

2. The method of claim 1, wherein the produced modified source code is semantically correct.

3. The method of claim 1, wherein the deconditioning further comprises:
    slicing the original source code into a plurality of slices, wherein the slicing comprises masking out selected conditional directives of the original source code.

4. The method of claim 3, wherein the slicing further comprises:
    masking out lines within conditional directives of the original source code that are false.

5. The method of claim 3, wherein the reconditioning further comprises:
    unmasking the selected conditional directives.

6. The method of claim 3, wherein the modified source code includes a plurality of transformed slices generated using the plurality of slices and wherein the reconditioning further comprises:
    merging the plurality of the transformed slices into a single unified version.

7. The method of claim 1, wherein the deconditioning further comprises:
    expanding macros in the original source code; and
    annotating respectively the original source code with expansion meta-data tags to indicate the expanded macros.

8. The method of claim 7, wherein the reconditioning further comprises:
    reducing the expanded macros using the expansion meta-data tags.

9. The method of claim 8, wherein the reducing the expanded macros includes using a regular expression to match on the expanded macros and replace macro parameters, including when macro parameter values have been modified.

10. The method of claim 1, wherein the deconditioning further comprises:
    removing line continuations in the original source code; and
    annotating the original source code with splits meta-data indicating line splits corresponding to the removed line continuation.

11. The method of claim 10, wherein the reconditioning further comprises:
    reconstructing the line continuations in the modified source code according to the splits meta-data line break tags.

12. The method of claim 1, wherein the parsing further comprises:
    generating the annotations in the AST form to represent meta-data tags generated in the original source code by the deconditioning.

13. The method of claim 12, wherein the performing the AST-based transformation further comprises:
    processing the annotations to re-produce the meta-data tags in the modified AST form.

14. The method of claim 13, wherein the reconditioning further comprises:
processing the meta-data tags to produce the modified source.

15. A system for handling preprocessing in source code transformation, the system comprising:
a memory for storing:
a deconditioning component for deconditioning an original source code to produce a parsable source code, the original source code including original preprocessing directives;
a parser component for parsing the parsable source code to produce an abstract syntax tree (AST) form, the AST form comprising annotations adapted to facilitate preservation of a style of the original source code;
a transformation engine component for performing an AST-based transformation on the AST form to produce a modified AST form; and
a reconditioning component for reconditioning the modified AST form to produce a modified source code conforming to the original source code style, the reconditioning comprising reconstructing a portion of the original preprocessing directives that was unaffected by the AST-based transformation; and
a processor adapted to execute the components stored in the memory to produce the modified source code based on the original source code.

16. The system of claim 15, wherein the deconditioning component further provides for:
masking out selected conditional directives of the original source code;
expanding macros in the original source code;
annotating the original source code with expansion meta-data tags to indicate the expanded macros;
removing line continuations in the original source code; and
annotating the original source code with splits meta-data indicating line splits corresponding the removed line continuation.

17. The system of claim 16, wherein the reconditioning component further provides for:
unmasking the selected conditional directives;
reducing the expanded macros using the expansion meta-data tags; and
reconstructing the line continuations in the modified source code according to the splits meta-data line break tags.

18. A computer-readable storage medium having instructions stored thereon which, when executed by a processor, perform a method for handling preprocessing in source code transformation, the method comprising:
deconditioning an original source code to produce a parsable source code, the original source code including original preprocessing directives;
parsing the parsable source code to produce an abstract syntax tree (AST) form, the AST form comprising annotations adapted to facilitate preservation of a style of the original source code;
performing an AST-based transformation on the AST form to produce a modified AST form; and
reconditioning the modified AST form to produce a modified source code conforming to the original source code style, reconditioning comprising reconstructing a portion of the original preprocessing directives that was unaffected by the AST-based transformation.

19. The computer readable storage medium of claim 18, further comprising:
generating the annotations in the AST form to represent meta-data tags generated in the original source code by the deconditioning, wherein the performing the AST-based transformation further comprises processing the annotations to re-produce the meta-data tags in the modified AST form, and wherein the reconditioning further processing the meta-data tags to produce the modified source.

20. The computer readable storage medium of claim 18, wherein the deconditioning further comprises:
masking out selected conditional directives of the original source code;
expanding macros in the original source code;
annotating the original source code with expansion meta-data tags to indicate the expanded macros;
removing line continuations in the original source code; and
annotating the original source code with splits meta-data indicating line splits corresponding the removed line continuation.

21. The computer readable storage medium of claim 20, wherein the reconditioning further comprises:
unmasking the selected conditional directives;
reducing the expanded macros using the expansion meta-data tags; and
reconstructing the line continuations in the modified source code according to the splits meta-data line break tags.

* * * * *

UNITED STATES PATENT AND TRADEMARK OFFICE
CERTIFICATE OF CORRECTION

PATENT NO. : 7,624,385 B2
APPLICATION NO. : 11/093530
DATED : November 24, 2009
INVENTOR(S) : Waddington et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Fourteenth Day of December, 2010

David J. Kappos
*Director of the United States Patent and Trademark Office*